3,751,410
STARCH DERIVATIVES
Joseph Ronald Caracci, Chicago, Felix Joseph Germino, Palos Park, and Tokuji Daniel Yoshida, Chicago, Ill., assignors to CPC International Inc.
No Drawing. Continuation of abandoned application Ser. No. 748,160, July 20, 1968. This application May 20, 1971, Ser. No. 145,479
Int. Cl. C08b 19/04
U.S. Cl. 260—233.5                                     1 Claim

ABSTRACT OF THE DISCLOSURE

A process for producing stable starch derivatives having utility as food components, particularly as thickeners. Starch is cross-linked by reacting with sodium tri-metaphosphate. After cross-linking the starch is modified by incorporation of a hydroxy propyl functional group.

The resulting product is stable and performs well in food compositions including acid systems such as fruit pie fillings or lemon puddings, or in neutral systems such as sauces, gravies, baby foods and chocolate puddings.

---

This is a continuation of application Ser. No. 748,160, filed July 20, 1968 now abandoned.

This invention relates to the production of new and useful starch derivatives.

More particularly, the invention relates to a process for producing stable starch derivatives having utility as food components and to the resulting products.

And more particularly the invention relates to a process for producing an improved acid-stable starch derivative, or an improved starch derivative stable in a neutral environment, having utility as a thickener in various prepared foods.

Products produced in accordance with our invention are particularly useful in the preparation of foods such as fruit pie fillings, lemon puddings, and the like, wherein they serve as thickeners, especially where stability and in particular, stability in an acid or neutral environment is required.

Also, products made in accordance with our invention have enhanced utility as thickeners in such neutral environments as sauces, gravies, baby foods and chocolate puddings.

Accordingly, a principal object of my invention is to produce a stable starch derivative having improved performance characteristics as a food thickener.

A further object is to produce an acid-stable pie filling starch derivative having improved performance characteristics.

A further object is to produce an acid-stable pie filling starch having improved resistance to the onset of syneresis.

A further object is to produce a food thickener having improved performance characteristics in a neutral environment such as sauces, gravies, baby foods, chocolate puddings and the like.

A still further object is to provide a new and useful starch derivative which has outstanding utility as a thickener for food preparations and which has outstanding heat stability.

Another object is to provide a starch derivative useful as a food thickener, which has improved heat stability together with improved viscosity characteristics.

In accordance with my invention, an improved starch derivative having outstanding utility as a food thickener, is produced by cross-linking starch to a particular level, and either before, during or after such cross-linking, into the starch is incorporated a certain functional group to a specific degree of substitution of the functional group attached to the starch.

The starch used may be illustratively waxy milo, potato, tapioca, corn, waxy corn, red milo, and high amylose starches. Preferred are potato starch, waxy starch and topioca starch.

The cross-linking agent used here is a sodium tri-metaphosphate. The functional group introduced in the starch is the hydroxypropyl group, most preferably introduced by reaction of starch with propylene oxide.

We have found that use of the specific cross-linking agent, sodium tri-metaphosphate, in particular combination with introduction of hydroxy propyl groups in the parent starch gives a superior starch thickener for use in the above outlined food compositions. Unexpectedly, such starch material is useful in both neutral and acid food systems by being stable in both environments. The starches of the invention are particularly useful thickeners in fruit pie fillings, in gravies, and in sauces.

Not only is the specific chemical make-up of the cross-linked starch important, but also extremely critical are the amounts of cross-linking and the molar substitution on starch of the hydroxy propyl group. We have found that in order to achieve both acid and neutral stability, as well as to realize resistance to syneresis the starting starch material must be cross-linked with a specific amount of sodium tri-metaphosphate. More particularly, we have found that each mole of starch must be cross-linked with 0.01–0.3 gram of sodium tri-metaphosphate. Moreover, the molar substitution (M.S.) should fall within a rather narrow range of 0.03 to 0.09. Only such defined starches possess the above discussed properties and as well have good heat stability and proper viscosity characteristics.

One specific procedure followed in carrying out my invention may be considered, for purposes of illustration, as being composed of four stages, or steps, these being (I) cross-linking; (II) washing; (III) substitution, and (IV) final product purification stage, as typified in the following:

(I) CROSS-LINKING (1) A slurry of waxy starch is prepared so that it has a total solids content of 35–36%, with a slurry temperature of between about 110 and 125° F., and is transferred to a reaction tank.

(2) Sodium chloride in an amount of 6 pounds per 100 pounds of starch is added.

(3) 1.5 pounds of sodium hydroxide per 100 pounds of starch is added, as a 4%–50% solution.

(4) 100 grams of sodium tri-metaphosphate per 100 pounds of starch is added, as a 1.6% solution.

(5) The slurry is heated to 110°–125° F. and held at temperatures for 5–8 hours.

(6) The slurry is then neutralized to pH 5 by the addition of hydrochloric acid (16%–37%).

In the foregoing cross-linking procedure, the solids content of the slurry may range from about 28.5% to about 29.5%. The sodium chloride may range from about 0.160 to 0.165 moles/mole starch. The sodium tri-metaphosphate may range from about 0.10 to 0.30 gram per mole of starch. The sodium hydroxide content may range from about 0.050 to about 0.055 mole/mole of starch.

The slurry may be held at the reaction temperature for from about 5 to about 11 hours, and the acidity thereof is adjusted to from about pH 6.0 to pH 6.5.

(II) WASHING

The slurry is washed, using conventional means, e.g., a Merco-Dorrclone wash, to remove the salts present.

(III) SUBSTITUTION (1) The wet slurry is then transferred to a reaction tank and the solids adjusted to a content of 35%–36%, the temperature of the slurry being maintained at 110°–125° F.

(2) 6 pounds of sodium chloride per 100 pounds of starch are added.

(3) There is then added 1.5 pounds of sodium hydroxide per 100 pounds of starch as a 4%–50% solution.

(4) 2 to 7 pounds of propylene oxide per 100 pounds of starch is then added.

(5) The slurry is heated to 110°–125° F. and held at temperature for about 18 hours.

(6) The slurry is then neutralized to pH 5–6 with hydrochloric acid solution (with 16%–30%).

In the foregoing hydroxy propylation substitution stage, the sodium chloride used may vary from about 0.33–0.35 mole/mole of starch. The sodium hydroxide may vary from about 0.078–0.082 mole/mole of starch, and of course equivalent amounts of another catalyst, e.g., calcium hydroxide can be used. The propylene oxide used may vary from about 0.06–0.20 mole/mole of starch, since the reaction efficiency is about 50%. The slurry may be kept at reaction temperatures of about 110°–125° F. for about 5–8 hours, and the neutralization carried out to a pH of approximately 3.0–3.5.

(IV) PRODUCT PURIFICATION

The product is then washed and dried using conventional wash procedures, as in Stage (II), above.

The useful starches of the invention may also be prepared by first reacting starch with propylene oxide, and then cross-linking the derivatized starch product with sodium tri-metaphosphate.

Likewise, the products described here may be made by simultaneous reaction of starch with propylene oxide and sodium tri-metaphosphate, and, in fact, this is the preferred method. The simultaneous reaction may be broadly carried out by making up a slurry of starch, propylene oxide, and sodium tri-metaphosphate. The slurry is usually made alkaline to promote the action of starch with propylene oxide. Generally, the simultaneous reaction is run from about 4 to about 12 hours at a temperature ranging from about 110° F. to about 130° F. Thereafter the starch product slurry is neutralized to a pH of about 6.0 and salts removed by washing. When the simultaneous mode of reaction is practiced the amount of sodium tri-metaphosphate range from about 0.01 to about 0.2 gram of sodium tri-metaphosphate per mole of starch. Again, the amount of propylene oxide which is used ranges from about 0.06 to about 0.20 mole per mole of starch to achieve the proper M.S.

The following detailed examples and description will further illustrate the process and product of my invention, it being understood that these are illustrative only:

Example I

To a starch slurry containing 1 mole of waxy milo starch is added 0.163 mole NaCl and 0.053 mole NaOH. The slurry is heated to 46° F. and 0.20 g. STMP is added. The mixture is allowed to react for 6 hours. The slurry is neutralized to 6.0 pH, filtered, washed and reslurried. The slurry is heated to 50° F. and 0.13 mole of propylene oxide is added. The mixture is allowed to proceed for 7 hours before being neutralized, filtered and washed. The product has a M.S. of 0.065. The product forms pie fillings which do not show syneresis for 8 cycles and give a cut pie rating of 9 for a 0–10 scale. The product also gives a lemon pudding viscosity of over 16,000 cps. (acceptable viscosity 9,000 cps.).

Example II

This run is carried out the same as in Example I except that the propylene oxide is increased to 0.185 mole thus giving a M.S. of 0.092. This product performs well in sauces, gravies, baby foods, or chocolate puddings, i.e., in a neutral environment.

Example III

Here the procedure is the same as Example I except that the STMP level is reduced to 0.15 g. The product has the same utilities as the product produced in Example II.

Example IV

This describes a single process for making both a product for a neutral system and one for an acid system. Essentially the white milo starch is overcross-linked and the excess cross-bonds are saponified off to the desired level.

To a starch slurry containing one mole of starch is added 0.163 mole NaCl and 0.053 mole NaOH. The slurry is heated to 46° C. and 0.30 g. STMP is added. The mixture is allowed to react for 8 hours before being neutralized, filtered and washed. The cake is reslurried in water and 0.34 mole of NaCl is added. The slurry is heated to 50° C. and 0.08 mole of NaOH is added. At this point saponification of the ester linkages begins.

If the slurry is allowed to react for 2–4 hours before 0.13 mole of propylene oxide is added a product for acid systems will be produced.

If the slurry is allowed to react for 6–8 hours a product for neutral systems will be obtained.

Example V

This example describes the method of making the starch products of the invention by simultaneous cross-linking with sodium tri-metaphosphate and derivatization with propylene oxide.

0.10 gram of sodium tri-metaphosphate per mole of starch are added to an aqueous slurry of granular starch containing about 30% starch solids. 0.130 mole of propylene oxide per mole of starch are also added to the slurry as well as 0.08 mole of sodium hydroxide. Sodium chloride is also added here.

Reaction is then effected over a period of about 8 hours at 120° F., the product starch slurry neutralized to a pH of about 6.0 and then the granular starch product filtered and washed. Finally, the product is dried to a moisture content of about 10%.

While the products of our invention will vary somewhat in their physical characteristics and the efficiency with which they function as a food thickener, it can be said that for best results, the products of our invention will be found to have a Brookfield viscosity at 25° C. of a paste cooked through a Brabender cycle greater than about 3,000 cps. and less than about 7,000 cps.

The Scott viscosity of our products will generally be as follows: 8–15 g. (d.b.) between 35–90 seconds.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claim.

The invention is hereby claimed as follows:

1. A method for producing an improved cross-linked hydroxy-propylated starch food thickener that is stable in both acid and neutral media which comprises the following steps, in order:

forming an aqueous slurry of starch;
adding to said slurry about 0.160 to 0.165 mole of sodium chloride and about 0.050 to 0.055 mole of sodium hydroxide per mole of starch;
mixing with said slurry about 0.01 to 0.30 gram of sodium tri-metaphosphate per mole of starch;
heating said slurry at a temperature of from about 110° F. to 125° F. to cross-link said starch;
adjusting the pH of said slurry to about 5;
adding to said slurry of cross-linked starch about 0.33 to 0.35 mole of sodium chloride and about 0.078 to 0.082 mole of sodium hydroxide, per mole of cross-linked starch;

mixing with said slurry about 0.06 to 0.20 mole of propylene oxide per mole of starch;

heating said slurry to a temperature of from about 110° F. to 125° F.;

adjusting the pH of said slurry to about 3.0 to 3.5; and recovering the cross-linked hydroxypropylated starch.

References Cited
UNITED STATES PATENTS

| | | | |
|---|---|---|---|
| 2,938,901 | 5/1960 | Kerr et al. | 260—233.5 |
| 3,127,392 | 3/1964 | Fisher et al. | 260—233.3 |
| 3,378,546 | 4/1968 | Tsuzuki | 260—233.3 |
| 3,422,088 | 1/1969 | Tuschhoff et al. | 260—233.3 |
| 2,845,417 | 7/1958 | Kesler et al. | 260—233.3 |
| 2,938,901 | 5/1960 | Kerr et al. | 260—233.5 |
| 3,378,546 | 4/1968 | Tsuzuki | 260—233.3 |
| 3,369,910 | 2/1968 | Ganz et al. | 99—139 |

MAURICE L. WELSH, Primary Examiner

M. I. MARQUIS, Assistant Examiner

U.S. Cl. X.R.

99—139; 260—233.3 R